(12) United States Patent
Kawamura et al.

(10) Patent No.: US 6,318,338 B1
(45) Date of Patent: Nov. 20, 2001

(54) ACTUATOR

(75) Inventors: Yuji Kawamura; Masao Ida; Makoto Uchida, all of Yokohama (JP)

(73) Assignee: Jidosha Denki Kogyo Kabushiki Kaisha, Kanagawa (JP)

( * ) Notice: Subject to any disclaimer, the term of this patent is extended or adjusted under 35 U.S.C. 154(b) by 0 days.

(21) Appl. No.: 09/618,056

(22) Filed: Jul. 17, 2000

(30) Foreign Application Priority Data

Jul. 16, 1999 (JP) .................................................. 11-202875

(51) Int. Cl.$^7$ ...................................................... F02D 37/00
(52) U.S. Cl. ............................................. 123/399; 123/400
(58) Field of Search .................................... 123/399, 400, 123/403, 395

(56) References Cited

U.S. PATENT DOCUMENTS

| | | | |
|---|---|---|---|
| 4,889,093 | * 12/1989 | Nishiyama | 123/399 |
| 4,909,212 | * 3/1990 | Minowa et al. | 123/399 |
| 4,932,375 | * 6/1990 | Burney | 123/361 |
| 6,080,075 | * 6/2000 | Wussow et al. | 123/399 |

* cited by examiner

*Primary Examiner*—Bibhu Mohanty
(74) *Attorney, Agent, or Firm*—Sughrue, Mion, Zinn, Macpeak & Seas, PLLC

(57) ABSTRACT

An actuator used for an automatic cruising control device and possible to be assembled very easily, which comprises an electric motor, reduction gear, an electromagnetic clutch provided with a clutch yoke and a bobbin formed with a coil, an output pulley to be connected to a throttle valve of the engine of the motor vehicle through a throttle cable, and the clutch yoke and the bobbin are provided with coupling means composed of, for example, a hook formed to the bobbin, a hook-insertion hole formed in the clutch yoke and a hook-engaging part formed in the vicinity of the hook-insertion hole of the clutch yoke. The bobbin is easily fastened to the clutch yoke through the coupling means by snap action.

10 Claims, 11 Drawing Sheets

ACTUATOR

BACKGROUND OF THE INVENTION

1. Field of the Invention

This invention relates to an actuator used, for example, for a cruise control device for automatically controlling running speed of the motor vehicle in the predetermined and desired value.

2. Description of the Prior Art

As an actuator for the cruise control device, a device has been known, which is provided with an output pulley connected to the throttle valve of the engine through a throttle cable, an electric motor, and an electromagnetic clutch for connecting the output pulley and the electric motor by excitation, and so structured as to pull the throttle cable and control the throttle valve in the opening or closing direction by actuating the electromagnetic clutch and rotating the electric motor together with the output pulley.

However, in the aforementioned conventional actuator, the electromagnetic clutch is provided with a clutch yoke and a bobbin formed with a coil, and the bobbin is housed in the clutch yoke by securing the bobbin to the clutch yoke through caulking. Accordingly, there is a problem in that it is troublesome to attach the bobbin into the motor yoke and difficult to save manpower required for assembling the actuator.

Furthermore, in the aforementioned actuator, although a non-magnetic clutch washer is disposed between the clutch yoke of the electromagnetic clutch and a rotor combined with a wheel gear transmitted with rotational force of the electric motor in order to prevent sliding resistance to increase by magnetic attractive force, the clutch washer does not positioned on a side of neither the clutch yoke nor the rotor. Consequently, there is another problem in that it is difficult to accurately incorporate the clutch washer and there is the possibility that the clutch washer is dislocated.

SUMMARY OF THE INVENTION

This invention is made in view of the aforementioned problem of the prior art, and it is an object to provide an actuator which is possible to improve productivity by reducing the manpower required for assembling the actuator of this kind.

In order to accomplish the aforementioned object, the actuator according to this invention is provided with an electric motor, reduction gears, an electromagnetic clutch and an output pulley, the electromagnetic clutch is provided with a clutch yoke and a bobbin to be housed in the clutch yoke, which are provided with coupling means composed of, for example, a hook formed on the side of bobbin, a hook-insertion hole and a hook-engaging part formed on the side of clutch yoke, and the bobbin is easily fastened to the clutch yoke with the coupling means by snap action. Accordingly, the assembly operation of the actuator is simplified as compared with the caulking process.

In the actuator according to this invention which is provided with a case, an electric motor, reduction gears, an output shaft, a clutch yoke formed with a first supporting port and a rotor formed with a second supporting port, a coil, a clutch disk, an output pulley, a clutch spring and a clutch washer to be disposed between clutch yoke and rotor, the clutch washer is located accurately between the clutch yoke and the rotor by the first and second supporting parts. Therefore the clutch washer is incorporated easily and accurately into the actuator without dislocation and the productivity of the actuator is improved.

DESCRIPTION OF PREFERRED EMBODIMENT

Figure 1:
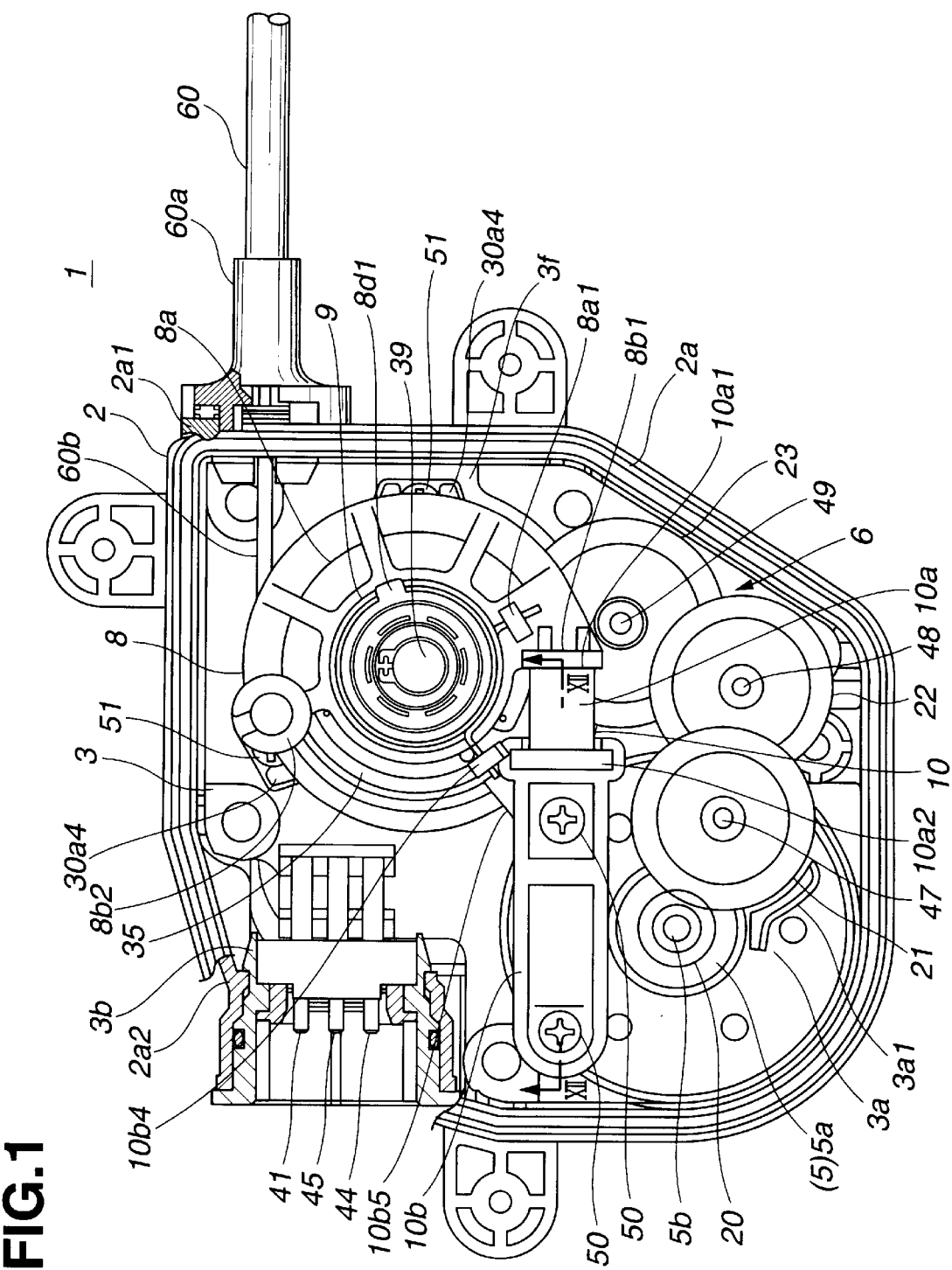
FIG. 1 is a top view illustrating internal configuration of an actuator according to an embodiment of this invention.

An actuator according to an embodiment of this invention will be described below on the basis of FIG. 1 to FIG. 12.

The actuator 1 is mainly composed of an outer case 2, an inner case 3, an outer case cover 4, an electric motor 5, reduction gears 6, an electromagnetic clutch 7, an output pulley 8, a return spring 9 and a damper 10. The reduction gears 6 is provided with a pinion 20, a first gear 21, a second gear 22, a third gear 23 and a wheel gear 24. The electromagnetic clutch 7 is provided with a clutch yoke 30, a bobbin 31, a coil 32, a clutch washer 33, a rotor 34, a clutch disk 35, a bushing 36, an input-side hub 37, a clutch spring 38, an output shaft 39, and an output-side hub 40. The inner case 3 is formed protrudingly with a cover plate 3a1 on a motor-holder portion 3a in order to prevent scattering of oil applied to the pinion 20.

The outer case 2 has a case body 2a with an opening on the upper part, the case body 2a is formed with a cable-supporting part 2a1 on one side thereof, and formed with a connector-fitting part 2a2 on the other side thereof. The cable-supporting part 2a1 of the outer case body 2a is fixed with a cable case 60a of a throttle cable 60 connected to the throttle valve of the engine, and a cable body 60b of the throttle cable 60 is led into the outer case 2 through the cable-supporting part 2a1. The connector-fitting part 2a2 of the outer case body 2a is fitted with a connector socket 3b, which is connected to the connector plug of the automatic cruising control circuit on the outside.

The inner case 3 is secured on the inside of the outer case 2 through thermal caulking. The inner case 3 is made from resin and disposed on the bottom side of the outer case 2 and provided with the motor-holder portion 3a, the connector socket 3b, a first axle holder 3c, a second axle holder 3d, a third axle holder 3e, a yoke-fixing portion 3f and a damper bed 3g as shown in FIG. 11.

The inner case 3 is formed with a motor yoke 5a of the electric motor 5 in one united body at the motor-holder portion 3a thereof. The electric motor 5 is a stepping motor, and is incorporated in the order of a rotator 5c having a motor shaft 5b, a stator 5d, a circuit base 5e in the motor yoke 5a as shown in FIG. 11. The rotator 5c is fixed with the pinion 20 on the motor shaft 5b. The stator 5d is provided with six stator coil 5d1, 5d2, 5d3, 5d4, 5d5 and 5d6.

Figure 11:
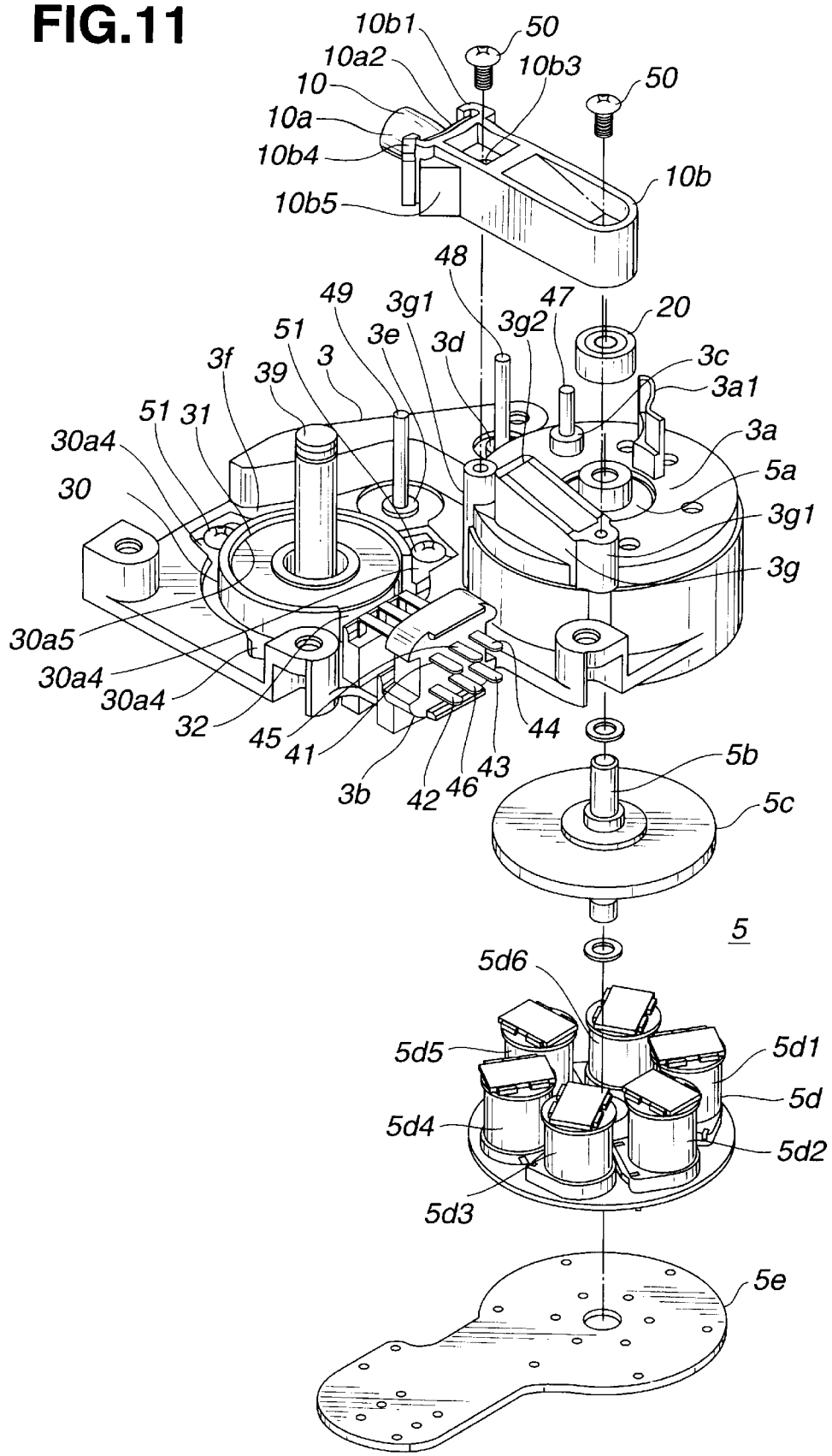
FIG. 11 is a perspective view illustrating assembly of a damper and an electric motor to an inner case in the actuator shown in FIG. 1.

An electric circuit formed on the circuit base 5e is connected with a first to a sixth terminal 41, 42, 43, 44, 45 and 46 of the connector socket 3b shown in FIG. 11. The motor 5 is disposed between the outer case 2 and the inner case 3 with the motor yoke 5a formed independently from the outer case 2 and vibration at the time of rotation of the rotator 5c is hard to transmit directly to the outer case 2, consequently, sound isolation of the motor 5 is done with the inner case 3.

The first and the second terminals 41 and 42 are electrically connected with the coil 32 of the electromagnetic clutch 7 through the electric circuit on the circuit base 5e for supplying an electric current to the coil 32 from the automatic cruising control circuit so as to excite the coil 32.

The third terminal 43 is the common terminal and electrically connected with the stator 5d of the electric motor 5 through the electric circuit on the circuit base 5e.

The fourth terminal 44 is the terminal to pass a current into the first phase among the stator 5d of the motor 5, and connected electrically with the first phase of the stator 5d of the electric motor 5 through the electric circuit on the circuit base 5e.

The fifth terminal 45 is the terminal to pass a current into the second phase among the stator 5d of the electric motor 5, and connected electrically with the second phase of the stator 5d of the motor 5 through the electric circuit on the circuit base 5e.

The sixth terminal 46 is the terminal to pass a current into the third phase among the stator 5d of the electric motor 5, and electrically connected with the third phase of the stator 5d of the motor 5 through the electric circuit on the circuit on the circuit base 5e.

The fourth, fifth and sixth terminals 44, 45 and 46 form a rotating magnetic field around the rotator 5c of the motor 5 by supplying a motor-driving current given through the automatic cruising control circuit into the first, second and third phases of the rotator 5d in order.

The inner case 3 is fixed with a first axle 47 in the first axle holder 3c. The first axle 47 is disposed in parallel to the motor shaft 5b of the electric motor 5. The first gear 21 is supported rotatably by the first axle 47.

Figure 2:
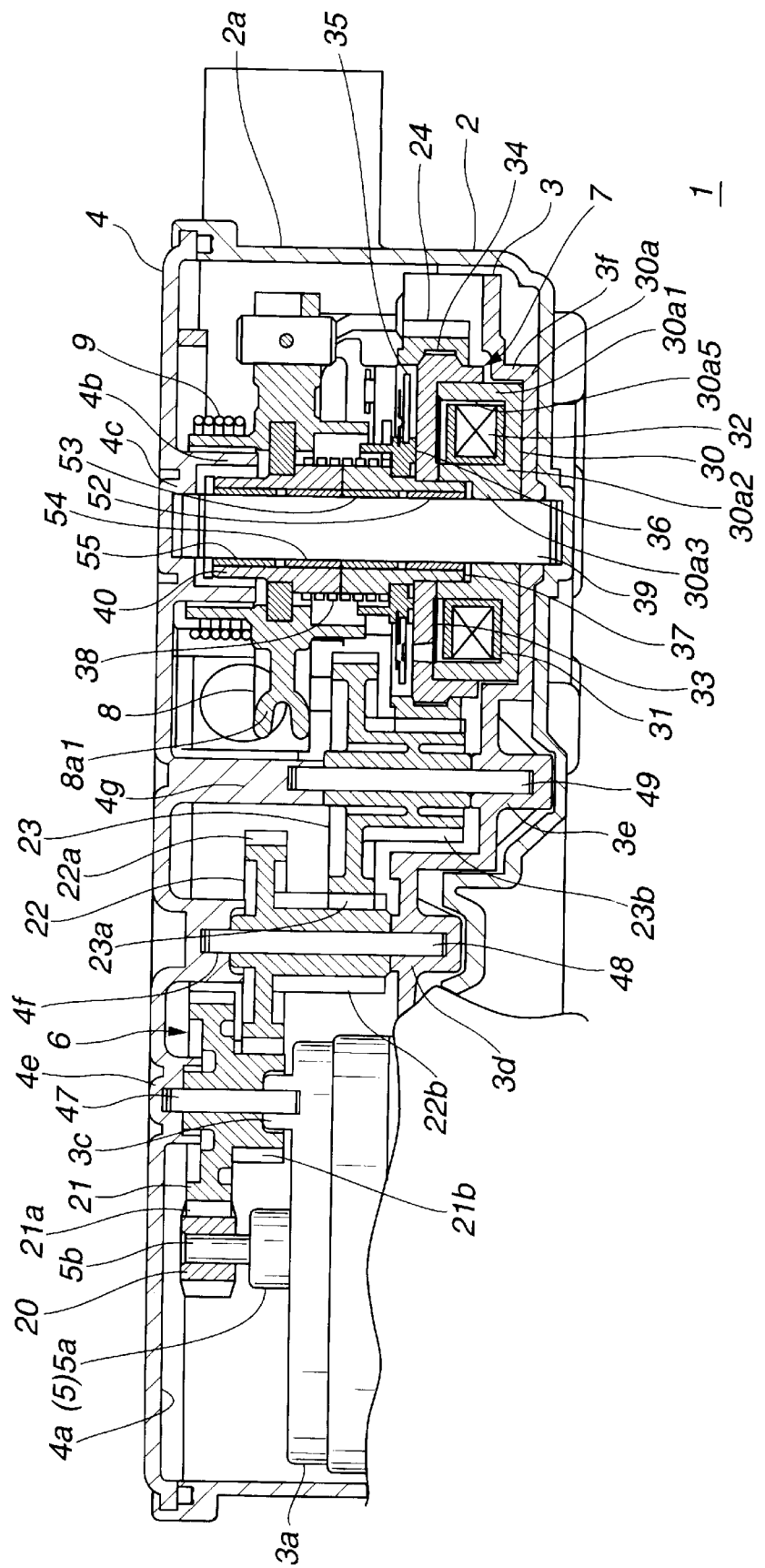
FIG. 2 is a vertical sectional view of the actuator shown in FIG. 1 taken on the planes of the lines connecting between respective shafts.

The first gear 21 is provided with a large diameter portion 21a being a spur gear and a small diameter portion 21b similarly being a spur gear as shown in FIG. 2, and the large diameter portion 21a of the first gear 21 is meshed with the pinion 20 of the motor shaft 5b. The first gear 21 transmits the rotation of the pinion 20 to the second gear 22 after reduction of the rotational speed of the pinion 20.

The second axle holder 3d of the inner case 3 is disposed on a stage lower than the first axle holder 3c, and a second axle 48 is fixed in the second axle holder 3d. The second axle 48 is disposed in parallel to the first axle 47. The second gear 22 is supported rotatably by the second axle 48.

The second gear 22 is also provided with a large diameter portion 22a being a spur gear and a small diameter portion 22b being a spur gear as shown in FIG. 2, and the large diameter portion 22a of the second gear 22 is meshed with the small diameter portion 21b of the first gear 21. The second gear 22 transmits the rotation of the first gear 21 to the third gear 23 after reducing the rotational speed of the first gear 21.

The second axle holder 3e of the inner case 3 is disposed on a stage further lower than the second axle holder 3d, and a third axle 49 is fixed in the third axle holder 3e. The third axle 49 is also disposed in parallel to the second axle 48. The third gear 23 is supported rotatably by the third axle 49.

The third gear 23 is similarly provided with a large diameter portion 23a being a spur gear and a small diameter portion 23b being a spur gear as shown in FIG. 2, and the large diameter portion 23a is meshed with the small diameter portion 22b of the second gear 22. the third gear 23 transmits the rotation of the second gear 22 to the wheel gear 24 after reducing the rotational speed of the second gear 22.

The small diameter portion 23b of the third gear 23 is meshed with the wheel gear 24. the wheel gear 24 is supported rotatably by the output shaft 39 through the rotor 34 and the input-side hub 37.

In the reduction gears 6, the first axle 47, the second axle 48, the third axle 49 are disposed in parallel to the motor shaft 5b of the electric motor 5 and the output shaft 39, respectively.

Figure 3:
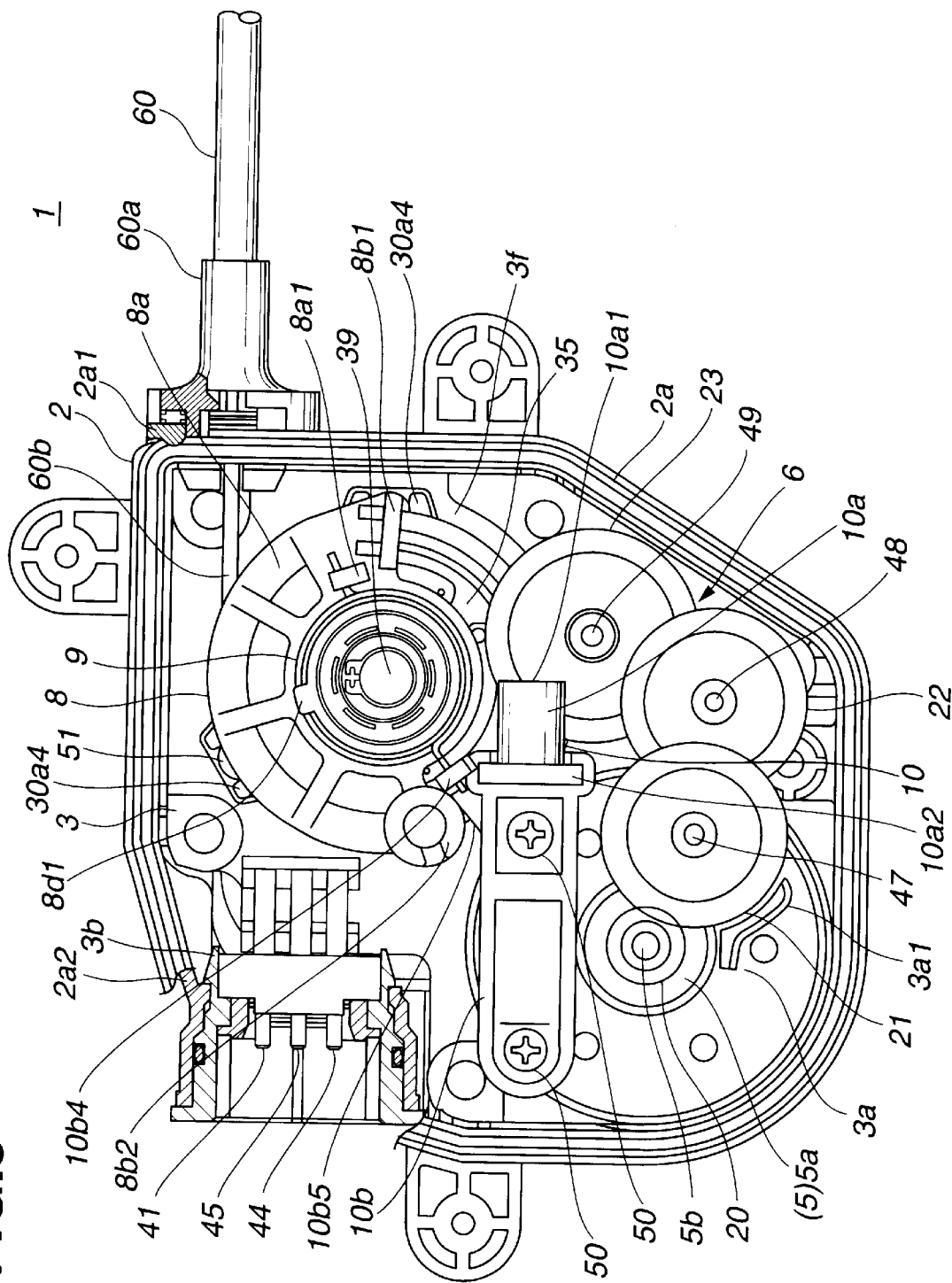
FIG. 3 is a top view illustrating the actuator shown in FIG. 1 in a case of pulling the throttle cable.

In the reduction gears 6, when the pinion 20 rotates in the anti-clockwise direction shown in FIGS. 1 and 3 according to the rotation of the motor shaft 5b of the motor 5 by supplying of the motor-driving current, the first gear 21 is rotated in the clockwise direction and the second gear 22 is rotated in the anti-clockwise direction, whereby the third gear 23 is rotate in the clockwise direction and the wheel gear 24 makes rotation in the anti-clockwise direction.

Figure 12:
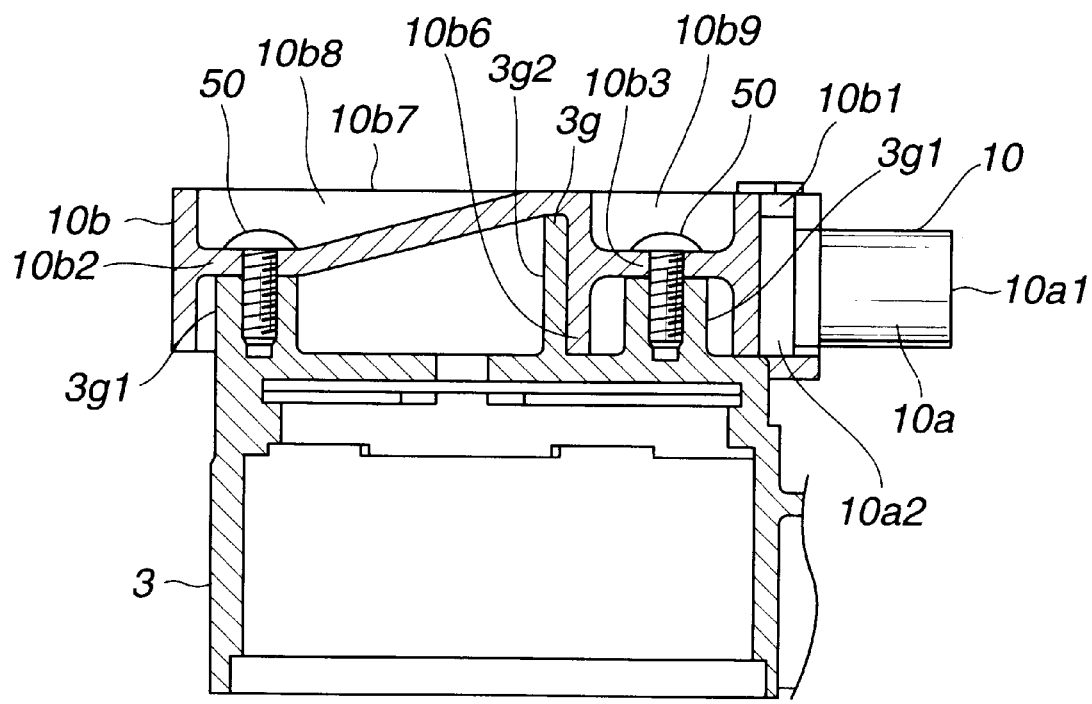
FIG. 12 is a vertical sectional view taken on the planes of lines XI—XI of FIG. 1.

The damper bed 3g of the inner case 3 is formed on the motor-holder portion 3a and provided with two bosses 3g1 projecting in cylindrical shapes from the motor-holder portion 3a and having screw holes and a support 3g2 formed between two bosses 3g1 as shown in FIGS. 11 and 12. The damper 10 is secured on the damper bed 3g with two screws 50.

The damper 10 is composed of a damper body 10a and a holder 10b.

The damper body 10a is formed in a cylindrical shape from rubber and provided with a first pulley receiver 10a1 and a flange 10a2 as shown in FIG. 12. The first pulley receiver 10a1 is so positioned at the top end of the damper body 10a as to knock against a first stopper 8b1 formed on the output pulley 8. The flange 10a2 is formed at the base end of the damper body 10a and the damper body 10a is held by fitting the flange 10a2 into the holder 10b.

The holder 10b is formed with resin and provided with a damper body-fitting part 10b1, screw hole plates 10b2 and 10b3, a spring-engaging part 10b4, a second pulley receiver 10b5 and a vertical plate 10b6 as shown in FIGS. 11 and 12. The flange 10a2 of the damper body 10a is fitted in the damper body-fitting part 10b1.

The screw hole plates 10b2 and 10b3 are formed so as to come in contact with the top faces of bosses 3g1 of the damper bed 3g at the time of placing the holder 10b on the damper bed 3g, and the screws 50 are screwed into the bosses 3g1 by piercing through the screw hole plates 10b2 and 10b3. The screw hole plates 10b2 and 10b3 are located at the position lower than an upper face 10b7 of the holder 10b and surrounded by side walls 10b8 and 10b9 as shown in FIGS. 11 and 12, and the outer case cover 4 comes in contact with the upper face 10a7 of the holder 10b at the time of completing the assemble of the actuator 1. Therefore, the screws 50 are shut up by the side walls 10b8 and 10b9 and the outer case cover 4 and never fall off from the holder 10b even if they are off from the bosses 3g1 of the damper bed 3g at the worst after mounting the actuator 1 on the vehicle body.

The spring-engaging part 10b4 of the holder 10b is engaged with one end of the return spring 9 for energizing the output pulley 8. the spring-engaging part 10b4 is formed in one united body with the holder 10b of the damper 10, and it is possible to reduce the manpower for forming and assembling as compared with the case of screwing the spring-engaging part formed separately on the inner case 3.

The second pulley receiver 10b5 is disposed to form a pair with the first pulley receiver 10a1 of the damper body 10a. The second pulley receiver 10b5 is so formed as to catch a second stopper 8b2 formed on the output pulley 8 at the time when the output pulley 8 pulls the cable body 60b of the throttle cable 60 by turning in the anti-clockwise direction as shown in FIG. 3.

The vertical plate 10b6 of the holder 10b is formed in parallel to a load-receiving plate 3g2 disposed between the bosses 3g1 of the damper bed 3g. The vertical plate 10b6 is in contact with the load-receiving plate 3g2 of the damper bed 3g in the state of attaching the holder 10b on the damper bed 3g and possible to distribute impact force caused by the collision of the first stopper 8b1 of the output pulley 8 against the first pulley receiver 10a1 of the damper body 10a into the load-receiving plate 3g2 so as not to apply the impact force to the holder 10b and the screws 50 directly. Consequently, the damper 10 is prevented from looseness of the screw connection and falling off from the damper bed 3g even for long time application.

In the yoke-fixing portion 3f of the inner case 3, the clutch yoke 30 is secured by screwing screws 51 as shown in FIGS. 1 and 11.

Figure 4:
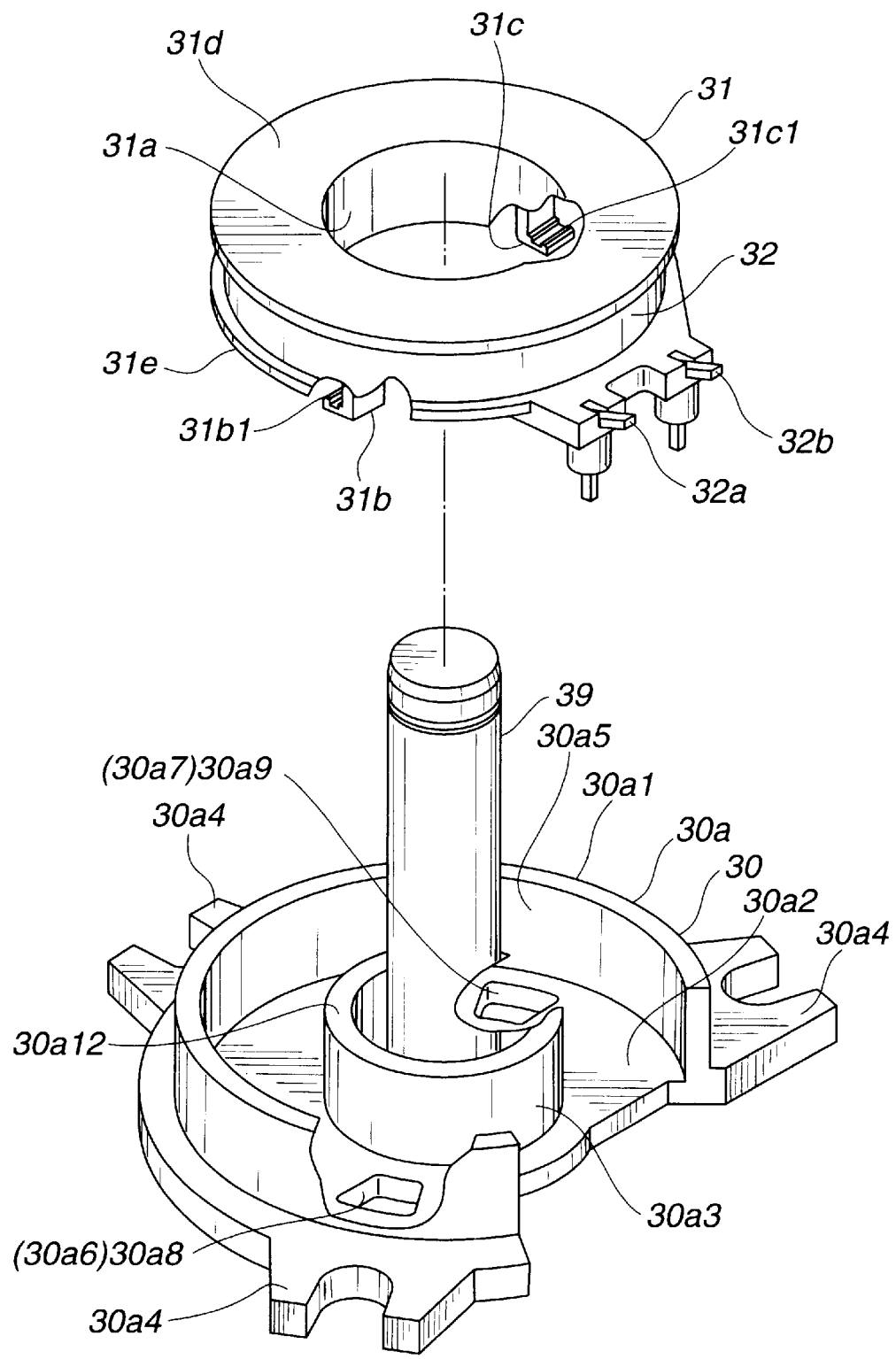
FIG. 4 is a perspective view illustrating assembly of a clutch yoke and a bobbin in the actuator shown in FIG. 1.

The clutch yoke 30 is formed by using magnetic material and provided with a yoke body 30a formed in a cylindrical shape with a bottom as shown in FIG. 4. The yoke body 30a is provided with an outer side plate 30a1, a bottom plate 30a2 and an outer side plate 30a3, and formed protrudingly with three flanges 30a4 at three points on the outer periphery of the outer side plate 30a1 for securing the clutch yoke 30 in the inner case 3. The screws 51 are passed through the flanges 30a4 respectively, and screwed into the yoke-fixing portion 3f of the inner case 3 as shown in FIG. 11.

The yoke body 30a is formed with a bobbin container portion 30a5 between the outer and inner side plates 30a1 and 30a3, and further formed with bobbin-fastening parts 30a6 and 30a7 forming a part of coupling means in two points opposed with each other through the output shaft 39 as shown in FIG. 4.

Figure 5:
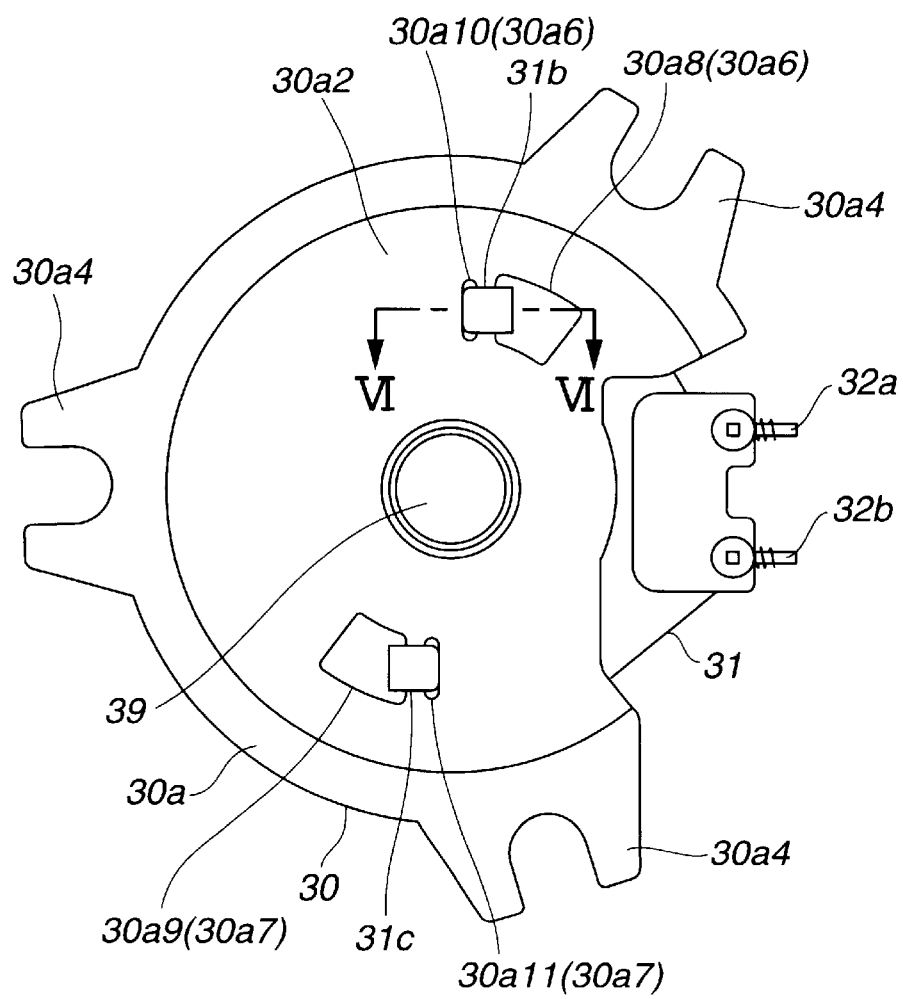
FIG. 5 is a bottom view of the clutch yoke and the bobbin shown in FIG. 4 in a state of being coupled with each other.
Figure 6:
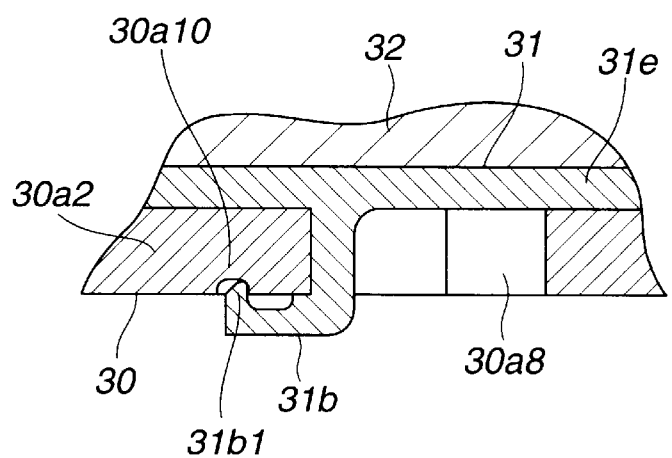
FIG. 6 is a vertical sectional view taken on the planes of lines IV—IV of FIG. 5.

The bobbin-fastening parts 30a6 and 30a7 are formed with hook-insertion holes 30a8 and 30a9 and hook-engaging parts 30a10 and 30a11 having concave cross sections, respectively as shown in FIGS. 5 and 6.

The hook-insertion holes 3018 and 30a9 of the yoke body 30a are designed so as to be passed through by hooks 31b and 31c formed to the bobbin 31 as described later from the upper side of the bottom plate 30a2 , respectively as shown in FIG. 4. The bobbin 31 is contained in the bobbin container portion 30a5 , turned in the clockwise direction shown in FIG. 4 after inserting the hooks 31b and 31c into the respective hook-insertion holes 30a8 and 30a9 and fastened to the clutch yoke 30 by engagement of the hooks 31b and 31c with the hook-engaging parts 30a10 and 30a11 of the yoke body 30a.

Figure 7:
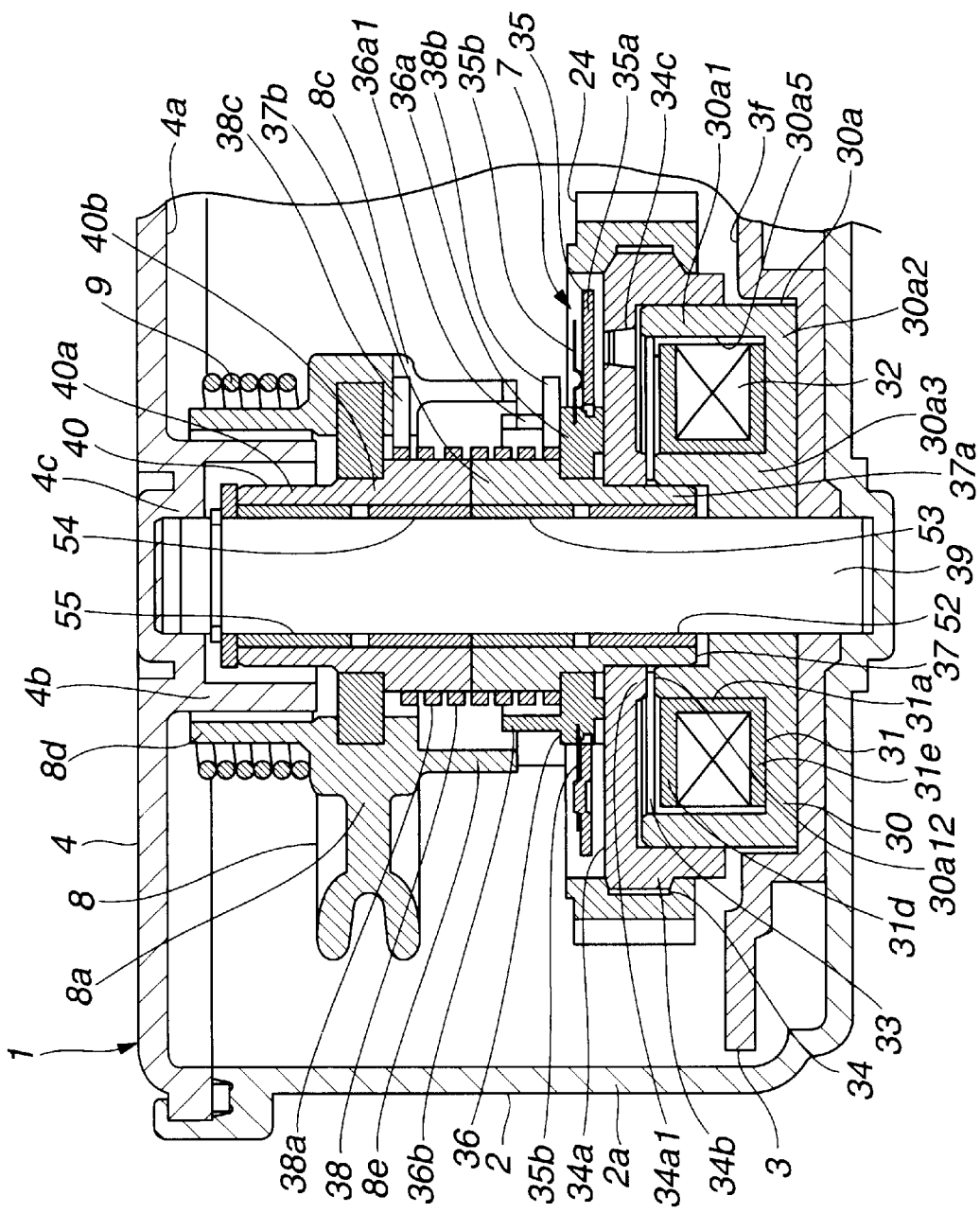
FIG. 7 is a vertical sectional view of an electromagnetic clutch in the actuator shown in FIG. 1.

The yoke body 30a is further formed with a first washer-supporting supporting part 30a12 in the top portion of the inner side plate 30a3 as shown in FIGS. 4 and 7. The first washer-supporting part 30a12 is formed in the position lower than the top end of the outer side plate 30a1 of the yoke body 30a. The clutch washer 33 is inserted between the first supporting part 30a12 and a second washer-supporting part 34a formed on the rotor 34 as described later, whereby a magnetic air gap with a predetermined size is maintained between the rotor 34 and the top face of the outer side plate 30a1 of the clutch yoke 30.

The output shaft 39 is secured in the center of the yoke body 30a at the base end thereof.

The bobbin 31 is provided with a first flange 31d and a second flange 31e on the upper and lower sides of the bobbin body 31a as shown in FIG. 4, the coil 32 is formed around the bobbin body 31a between upper and lower flanges 31d and 31e. Lead wire terminals 32a and 32b of the coil 32 are connected with the electric circuit on the circuit base 5e provided to the electric motor 5. The second flange 31e is provided with hooks 31b and 31c forming the other part of the coupling means.

The hooks 31b and 31c are formed protrudently in L-like shapes crooked in the opposite directions from each other at positions corresponding to the hook-insertion holes 30a8 and 30a9 of the clutch yoke 30, respectively. The hooks 31b and 31c are formed so that distances between the second flange 31e of the bobbin 31 and projections formed at the tip ends of the hooks 31b, 31c may be smaller than thickness of the bottom plate 30a2 of the clutch yoke 30, therefore the projections 31b1, 31c1 of the hooks 31b, 31c are engaged with the respective hook-engaging parts 30a10, 30a11 by merely turning the bobbin 31 contained in the bobbin container portion 30a5 of the clutch yoke 30 as shown in FIG. 6, thereby fastening the bobbin 31 to the clutch yoke 30 firmly as mentioned above.

Namely, at the time of attaching the bobbin 31 to the clutch yoke 30, the bobbin 31 is secured to the clutch yoke 30 through the snap action of the hooks 31b and 31c by merely turning the bobbin 31 after containing it in the bobbin container portion 31a5 of the clutch yoke 30. Therefore, it is possible to simplify the assemble work and to reduce the manpower in the assemble operation as compared with the conventional actuator of which bobbin is secured with the clutch yoke by caulking after containing the bobbin into the clutch yoke.

Figure 8:
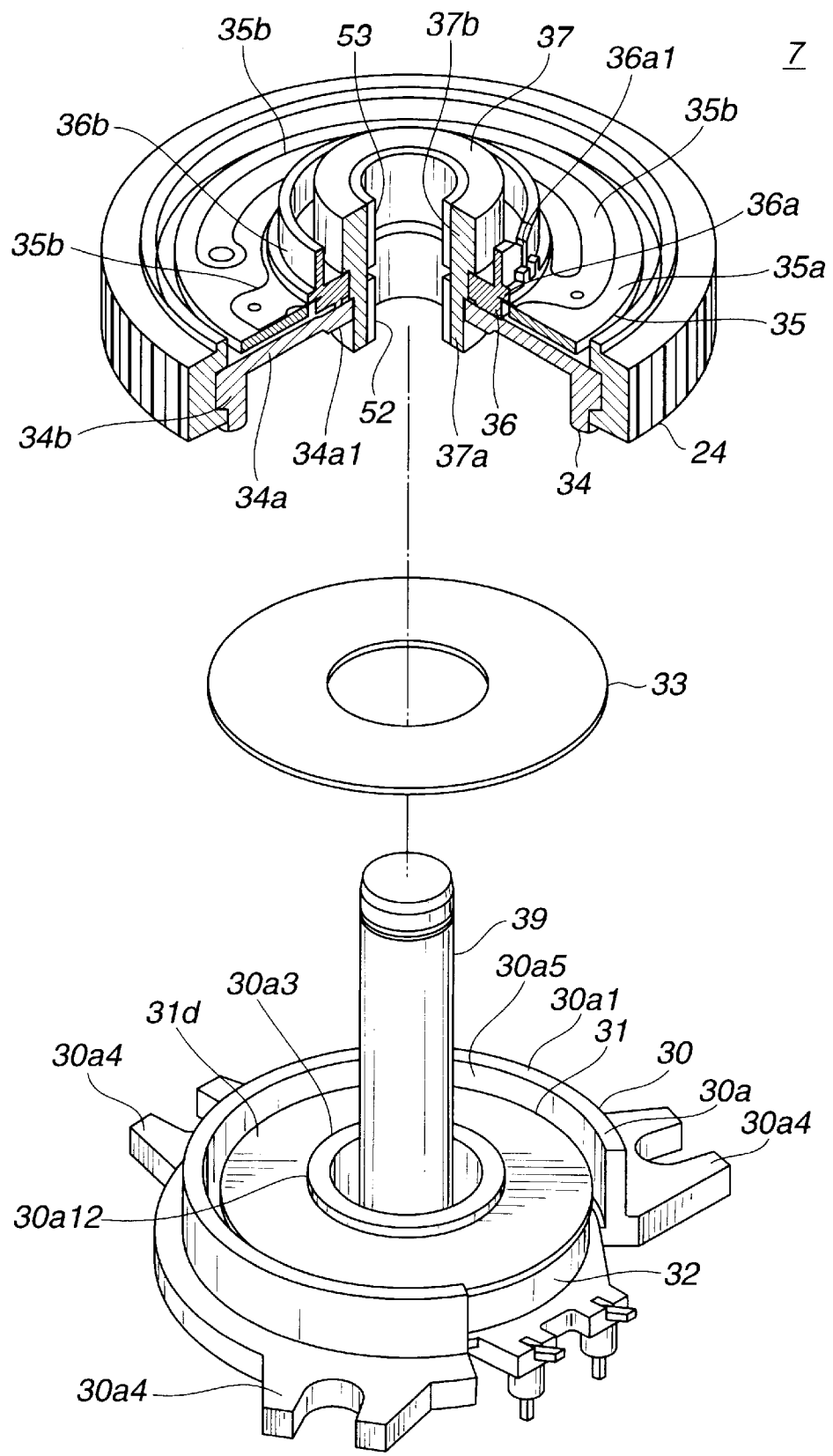
FIG. 8 is a perspective view illustrating assembly of the clutch yoke, a clutch washer and a rotor in the actuator shown in FIG. 1.

The rotor 34 is disposed on the upper side of the clutch yoke 30 and the bobbin 31 through the clutch washer 33 as shown in FIG. 8. The clutch washer 33 is made in an annular shaped thin plate from non-magnetic material.

The clutch washer 33 has an outer diameter slightly smaller than the inner diameter of the outer side plate 30a1 of the clutch yoke 30, and the clutch washer 33 is positioned by the outer side plate 30a1 of the clutch yoke 30 at the outer periphery thereof in the state of being placed between the first washer-supporting part 30a12 of the clutch yoke 30 and the second washer-supporting part 34a1 of the rotor 34. The clutch washer 33 makes sliding action between the clutch yoke 30 and the rotor 34 and has a function to prevent increase of the sliding resistance between the clutch yoke 30 and the rotor 34 caused by the attractive force of the clutch yoke 30.

The clutch washer 33 is positioned with the outer side plate 30a1 of the clutch yoke 30 at the outer periphery by being held between the first washer-supporting part 30a12 of the clutch yoke 30 and the second washer-supporting part 34a1 of the rotor 34 as mentioned above. Therefore, the positioning may be done more securely, and it is possible to prevent aberration of the position and possible to reduce the manpower of the assemble operation as compared with the conventional actuator of which clutch washer is merely placed on the clutch yoke.

The rotor 34 is formed with a side plate 34b on the outer peripheral part of a disk-shaped rotor body 34a, and the annular shaped wheel gear 24 is combined on the outer periphery of the side plate 34b. The rotor body 34a is combined with the input-side hub 37 supported rotatably by the output shaft 39, accordingly the rotor 34 is rotatably supported by the output shaft 39 together with the wheel gear 24. The rotor body 34a is partially formed with openings 34 as shown in FIG. 7, and the magnetic resistance of the rotor body 34a becomes larger by the openings 34c. Therefore, magnetic flux passing through the rotor body 34a passes through the clutch disk 35 in the positions of the openings 34c.

The rotor body 34a is also formed with the second washer-supporting part 34a in the middle thereof. The second washer-supporting part 34a is protrusively formed from the lower face of the rotor body 34a, and the magnetic air gap having the predetermined size is secured between the rotor 34 and the outer side plate 30a1 of the clutch yoke 30 by holding the clutch washer 33 between the second washer-supporting part 34a1 and the second washer-supporting part 30a12 of the clutch yoke 30 as described above.

The input-side 37 is formed in a cylindrical shape and supported rotatably by the output shaft 39 through the first and second bearings 52 and 53 attached on the inner periphery thereof. The input-side hub 37 is formed in one body of a thin-walled part 37a with a small diameter and a thick-walled part 37b with a diameter larger than that of thin-walled part 37a as shown in FIG. 8, and the thin-walled part 37a of the input-side hub 37 is secured to the center of the rotor 34 and rotatably inserted into the center hole of the bushing 36. The clutch spring 38 is disposed on the outside of the thick-walled part 37b of the input-side hub 37.

The clutch disk 35 is connected with a bushing body 36a of the bushing 36 through a disk-return spring 35b at a disk body 35a formed in a shape of disk from magnetic material. The clutch disk 35 is structured so that the disk body 35a may be united with the rotor 34 by being attracted to the rotor body 34a of the rotor 34 against the elasticity of the disk-return spring 35b at the time of generating magnetic flux passing through the clutch yoke 30 and the rotor 34 according to excitation of the coil 32. On the contrary, the disk body 35a separates from the rotor body 34a of the rotor 34 by the elastic restoring force of the disk-return spring 35b and the clutch disk 35 is disconnected from the rotor 34 according to unexcitation of the coil 32.

The bushing 36 is composed of the ring-shaped bushing body 36a and a cylindrical part 36b formed protrusively in a cylindrical shape on the bushing body 36a as shown in FIGS. 7 and 8.

The bushing body 36a of the bushing 36 is connected with the disk body 35a of the clutch disk 35 through the disk-returning spring 35b as described above. The bushing body 36a is formed with a cutout 36a1 at a predetermined part thereof as shown in FIG. 8. The cutout 36a1 is engaged with a first engaging part 38b formed at the base end of the clutch spring 38 as explained later.

The cylindrical part 36b of the bushing 36 is disposed on the inner side of a second cylindrical portion 8e formed on the output pulley 8 so as to form a labyrinth seal together with the second cylindrical portion 8e of the output pulley 8 as described later.

The output-side hub 40 is formed in a cylindrical shape and disposed on the upper side of the input-side hub 37, and supported rotatably by the output shaft 39 through the third and fourth bearings 54 and 55 fitted rotatably onto the output shaft 39 and attached on the inner periphery thereof. The output-side hub 40 is formed in one body of a thin-walled part 40a having a small diameter and a thick-walled part 40b having a diameter larger than that of thin-walled part 40a, the thin-walled part 40a of the output-side hub 40 is combined with the output pulley 8, and the clutch spring 38 is disposed around the thick-walled part 40b of the hub 40.

The clutch spring 38 is a helical spring with a square cross section, and a spiral spring body 38a of the clutch spring 38 is disposed around the input and output-side hubs 37 and 40 as shown in FIG. 7. The clutch spring 38 is connected between the bushing 36 and the output pulley 8 by engaging the first engaging part 38b formed at the base end of the spring body 38a into the first cutout 36a1 of the bushing 36 and engaging the second engaging part 38c formed on the opposite end of the spring body 38a into a cutout 8c formed on the output pulley 8.

Figure 9:
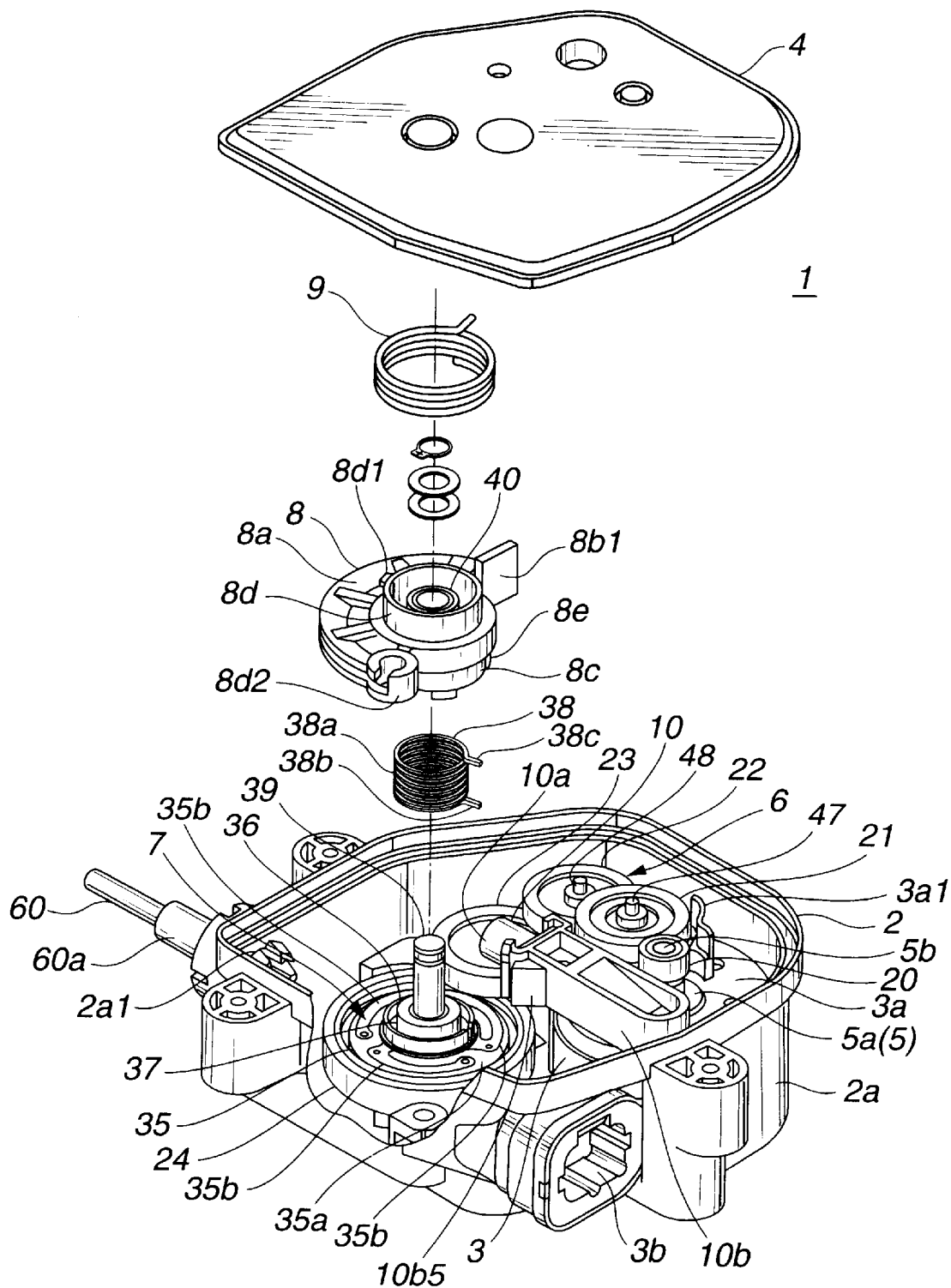
FIG. 9 is a perspective view illustrating assembly of an output pulley and a clutch spring onto an output shaft in the actuator shown in FIG. 1.

The clutch spring 38 has a function to turn the output pulley 8 together with the rotor 34 and the bushing 36 in the anti-clockwise direction shown in FIG. 1 by connecting the input and output-side bush 37 and 40 at the time when the rotational force is given to the wheel gear 24 in the anti-clockwise direction shown in FIG. 1 or 9 from the electric motor 5 through the reduction gears 6 at the same time of excitation of the coil 32 because the spring body 38a of the clutch spring 38 makes its own inner diameter smaller and winds round the thick-walled parts 37b and 40b of the input and output-side hubs 37 and 40 according as the clutch disk 35 attracted with the rotor 34 is rotated by the rotor 34 together with the bushing 36 in the anti-clockwise direction.

The clutch spring 38 maintains the connection between the input and output-side hubs 37 and 40 and holds the output pulley 8 at the present position even after interrupting the power supply to the wheel gear 24 so long as the excitation of the coil 32 is continued.

The clutch disk 35 separates from the rotor 34 according to the unexcitation of the coil 32 and the bushing 36 becomes free from the rotor 34, thereby disconnecting the output-side hub 40 from the input-side hub 37.

Figure 10:
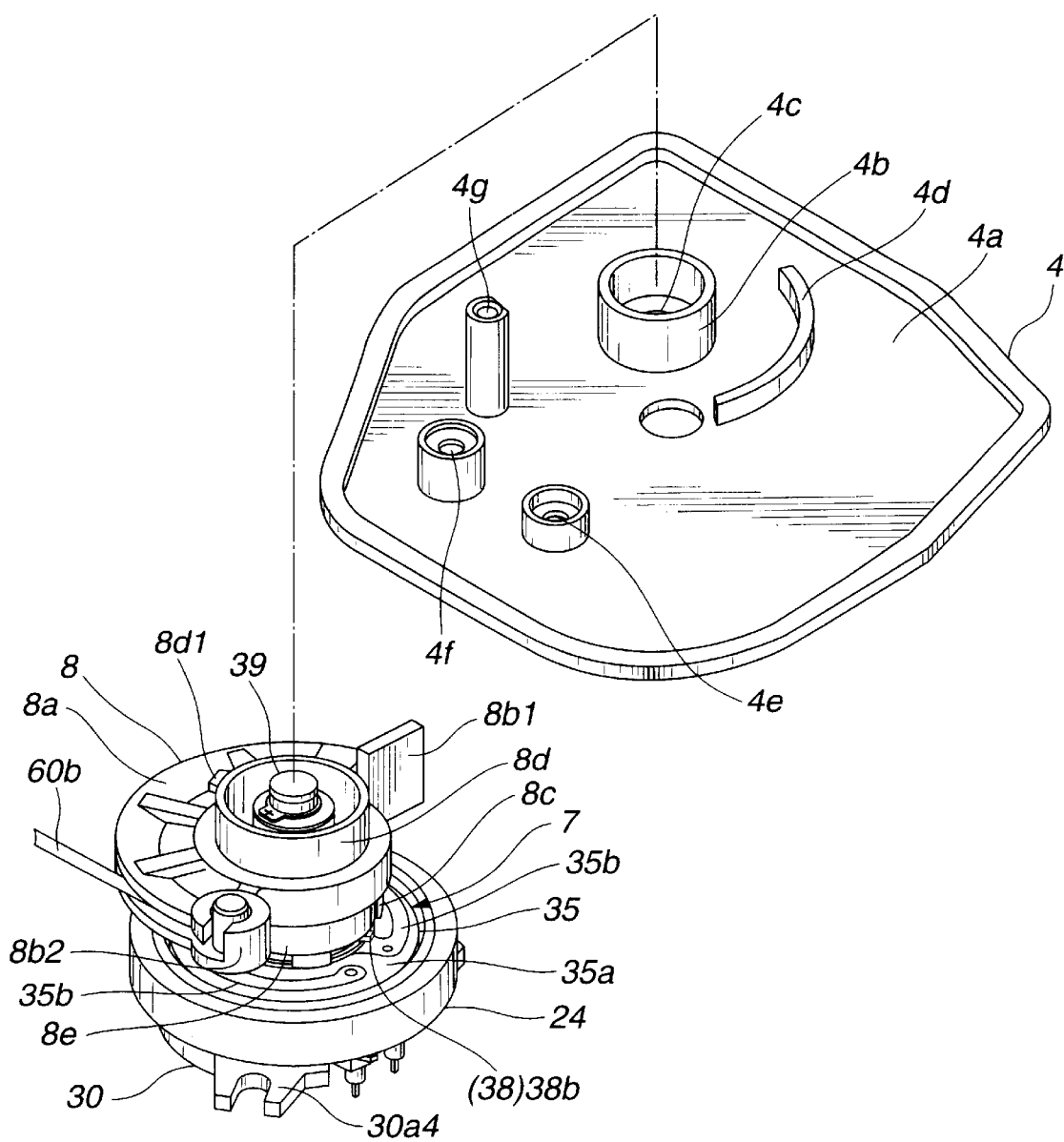
FIG. 10 is a perspective view illustrating assembly of an outer case cover onto the output shaft in the actuator shown in FIG. 1.

The output pulley 8 is formed with the plate-shaped first stopper 8b1 at a predetermined part of a pulley body 8a to be wound with the cable body 60b of the throttle cable 60 and formed with the second stopper 8b2 on the opposite side of the first stopper 8b1 as shown in FIG. 10. The output pulley 8 is further provided with a first cylindrical portion 8d projecting upwardly from the pulley body 8a and the second cylindrical portion Be protruding downwardly from the pulley body 8a as shown also in FIG. 7.

The first stopper 8b1 of the output pulley 8 is so formed as to strike against the first pulley receiver 10a1 of the damper 10 at the rotational end of the output pulley 8 in the returning side as shown in FIG. 1. The second stopper 8b2 is so formed as to strike against the second pulley receiver 10b5 of the damper 10 at the opposite rotational end of the pulley 8 at the time of fully pulling the cable body 60b of the throttle cable 60 as shown in FIG. 3.

The first cylindrical portion 8d of the output pulley 8 is disposed so as to cover the outside of a cylindrical covering part 4b provided to the outer case cover 4 as described later, thereby forming a labyrinth seal together with the cylindrical covering part 4b of the outer case over 4.

The second cylindrical portion 8e is disposed so as to cover the outside of the cylindrical part 36b of the bushing 36, so that the labyrinth seal is formed together with the cylindrical part 36b of the bushing 36 as explained above. According to the formation of the labyrinth seal, it is possible to prevent the input and output-side hubs 37 and 40, the clutch spring 38 and the output shaft 39 from dust or so.

The output pulley 8 is further formed with the cutout 8c for engaging the clutch spring 38 at a predetermined position of the pulley body 8a. The cutout 8c is formed by cutting one part of the second cylindrical portion 8e from the pulley body 8a as shown in FIG. 7, and the cutout 8c is engaged with the second engaging part 38c formed on the top end of the spring body 38a of the clutch spring 38.

The output pulley 8 is also formed with a projection 8d1 in one body at the upper end of the first cylindrical portion 8d, which has a function to prevent the end of the return spring 9 to come off from the output pulley 8. Therefore, the manpower may be reduced for the production as compared with the actuator of which return spring is secured so as not to come off from the pulley by attaching a separately formed clamp member.

The output pulley 8 is incorporated with the return spring 9 around the first cylindrical portion 8d thereof in order to energize the output pulley 8 in the returning direction (closing direction of the throttle valve). The return spring 9 is engaged into a spring-engaging part 8a1 formed on the pulley body 8a of the output pulley 8 at the base end thereof, and engaged into the other spring-engaging part 10b4 of the damper 10 at the top end thereof.

The outer case 2 is incorporated with the outer case cover 4 into the opening of the outer case body 2 a through welding or ultrasonic welding, for example. The outer case cover 4 is provided with the cylindrical covering part 4b, an output shaft-holding part 4c, a cable holder 4d, a first axle holder 4e, a second axle holder 4f and a third axle holder 4g on an inner face 4a.

The cylindrical covering part 4b is formed protrusively in a cylindrical shape from the inner face 4a of the outer case cover 4 and disposed so as to cover the output shaft 39 and the output-side hub 40, thereby forming the labyrinth seal together with the first cylindrical portion 8d of the output pulley 8 as described above. It is possible to protect the output-side hub 40 and the output shaft 39 from dust or so according to the formation of this labyrinth seal between the cylindrical covering part 4b of the outer case cover 4 and the first cylindrical portion 8d of the output pulley 8.

The output shaft-holding part 4c is formed in a concave shape in order to support an end of the output shaft 39, and the top end of the output shaft 39 is inserted in this output shaft-holding part 4c.

The cable holder 4d is also formed protrusively in an arc-like shape from the inner face 4a of the outer case cover 4 on the outside of the cylindrical covering part 4b, and this cable holder 4d has a function to make the cable body 60b of the throttle cable 60 connected with the output pulley 8 so as not to come off from the pulley 8.

The first axle holder 4e is formed in a concave shape in order to support the first axle 47 and the top end of the first axle 47 is inserted in the first axle holder 4e.

The second axle holder 4f is also formed in a concave shape in order to support the second axle 48, and the top end of the second axle 48 is inserted in the second axle holder 4f.

The third axle holder 4g is formed in a concave shape in order to support the third axle 49, and the top end of the third axle 49 is similarly inserted in the third axle holder 4g of the outer case cover 4.

The actuator 1 having the aforementioned structure is mounted to the vehicle body, namely the outer case 2 of the actuator 1 is screwed on a panel in the engine room of the vehicle, the cable body 60b of the throttle cable 60 is connected with the throttle valve of the engine, and the connecter socket 3b of the actuator 1 is inserted with the connecter plug of the automatic cruising control circuit.

When a cruise command signal is generated by switching on a command switch of the automatic cruising control circuit at the time the motor vehicle is running at the desired speed, the cruising control is started.

According to the start of the cruising control, the coil 32 is excited by supplying the clutch-on current to the coil 32 through the first and second terminals 41 and 42 of the connector 3b, whereby the clutch disk 35 is attracted to the rotor 34 of the electromagnetic clutch 7. At the same time, the motor driving current is supplied to the electric motor 5 for a time corresponding to initiarization through the third to sixth terminals 43, 44, 45 and 46 in the connector 3b, whereby the motor shaft 5b of the motor 5 is rotated in the anti-clockwise direction shown in FIG. 1, the rotational force in the anti-clockwise direction of the electric motor 5 is transmitted to the wheel gear 24 through the pinion 20, the first gear 21, the second gear 22 and the third gear 23, and the rotational force in the anti-clockwise direction is given to the wheel gear 24.

According to the rotation of the wheel gear 24 in the anti-clockwise direction, the rotor 24 is rotated together with the clutch plate 35 and the bushing 36 in the anti-clockwise direction, thereby rotating the output pulley 8 in the anti-clockwise direction through the input-side hub 37, the clutch spring 38 and the output-side hub 40. The output pulley 8 pulls the cable body 60b of the throttle cable 60 as much as a length corresponding to the present opening amount of the throttle valve and maintains the opening amount of the throttle valve even after the driver removes his foot from the accel pedal, so that the motor vehicle continues to cruise at the desired constant speed.

If the difference arises between the actual speed and the target (desired) speed of the vehicle after this, the electric motor 5 is supplied with a motor driving current from the automatic cruising control circuit through the terminals 43, 44, 45 and 46 and rotated in the forward (clockwise direction shown in FIG. 1, that is closing direction of the throttle valve) or reverse direction (anti-clockwise direction in FIG. 1, that is opening direction of the throttle valve), whereby the opening amount of the throttle valve is regulated so as to maintain the actual vehicle speed at the desired target speed.

As mentioned above, according to the actuator of this invention, the bobbin is fastened to the clutch yoke by the snap action of the coupling means. Therefore, the assemble operation of the bobbin to the clutch yoke is simplified as compared with the conventional actuator of which bobbin is secured with the clutch yoke through the caulking and an excellent effect can be obtained in that the manpower is reduced for the assemble operation and the productivity of the actuator is improved. Furthermore, the clutch washer is positioned between the clutch yoke and the rotor by the first supporting part of the clutch yoke and the second supporting part of the rotor. Therefore, the clutch washer is incorporated easily without dislocation as compared with the conventional actuator of which clutch washer is not positioned by neither the clutch yoke nor the rotor, and an excellent effect can be obtained in that the manpower required for the assemble operation is reduced and the productivity of the actuator is improved remarkably.

What is claimed is:

1. An actuator comprising:

an electric motor;

reduction gears connected with a motor shaft of said electric motor;

an electromagnetic clutch combined with a final section of said reduction gears; and an output pulley combined with load and an output section of said electromagnetic clutch, wherein said electromagnetic clutch is provided with a clutch yoke for forming a magnetic circuit and a bobbin housed in said clutch yoke, and said clutch yoke and said bobbin are formed with coupling means for fastening the bobbin to the clutch yoke by snap action.

2. An actuator comprising:

a case;

an electric motor housed in said case;

reduction gears housed in said case and connected with a motor shaft of said electric motor;

an output shaft maintained in said case;

a rotor combined with a final section of said reduction gears and supported rotatably by said output shaft;

a clutch yoke secured to said case;

a bobbin housed in said clutch yoke;

a coil formed around said bobbin;

a clutch disk rotatably supported by said output shaft to be attracted to said rotor according to excitation of said coil;

an output pulley rotatably supported by said output shaft and combined with load; and a clutch spring disposed around said output shaft and engaged between said clutch disk and said output pulley for transmitting rotational force of the rotor to the output pulley according as the clutch disk is attracted to the rotor by the excitation of the coil;

said clutch yoke and bobbin being formed with coupling means for fastening the bobbin to the clutch yoke by snap action.

3. An actuator as set forth in claim 1, wherein said coupling means is composed of:

a hook formed on a flange provided to said bobbin;

a hook-insertion hole formed in said clutch yoke for inserting the hook of said bobbin housed in the clutch yoke; and a hook-engaging part formed near said hook-insertion hole of the clutch yoke for engaging with said hook by turning the bobbin housed in the clutch yoke in a predetermined direction.

4. An actuator as set forth in claim 3, wherein said bobbin is further formed with a projection to be elastically engaged with the hook-engaging part of the clutch yoke at a tip end of said hook.

5. An actuator comprising:

a case;

an electric motor housed in said case;

reduction gears housed in said case and connected with a motor shaft of said electric motor;

an output shaft maintained in said case;

a rotor combined with a final section of said reduction gears and supported rotatably by said output shaft;

a clutch yoke secured to said case;

a coil housed in said clutch yoke;

a clutch disk rotatably supported by said output shaft to be attracted to said rotor according to excitation of said coil;

an output pulley rotatably supported by said output shaft and combined with load;

a clutch spring disposed around said output shaft and engaged between said clutch disk and said output pulley for transmitting rotational force of the rotor to the output pulley according as the clutch disk is attracted to the rotor be the excitation of the coil; and a clutch washer disposed between said clutch yoke and said rotor;

said clutch yoke being formed with a first supporting part for locating said clutch washer; and said rotor being formed with a second supporting part facing to said first supporting part of the clutch yoke for locating said clutch washer.

6. An actuator as set forth in claim 5, wherein said clutch yoke is provided with an outer side plate and an inner side plate with a difference in height, formed with a bobbin container portion between said outer and inner side plates, and said first supporting part is formed at a top portion of said inner side plate;

said rotor is provided with a rotor body covering said clutch yoke, and said second supporting part is formed at a stepped portion in the center of said rotor body.

7. An actuator as set forth in claim 2, wherein said case is composed of an outer case and an inner case to be fitted in the outer case;

said reduction gears are composed of a pinion secured to the motor shaft of said electric motor, a first gear rotatably supported by a first axle maintained in said inner case in parallel to said motor shaft and meshed with said pinion, a second gear rotatably supported by a second axle maintained in said inner case in parallel to said first axle and meshed with said first gear, a third gear rotatably supported by a third axle maintained in said inner gear in parallel to said second axle and meshed with said second gear, and a wheel gear combined with said rotor and meshed with said third gear.

8. An actuator as set forth in claim 7, wherein said actuator is used for actuating a throttle valve of an engine of a vehicle in an opening or closing direction; and said output pulley is combined with the throttle valve of the engine through a throttle cable.

9. An actuator as set forth in claim 2, wherein said coupling means is composed of:

a hook formed on a flange provided to said bobbin;

a hook-insertion hole formed in said clutch yoke for inserting the hook of said bobbin housed in the clutch yoke; and a hook-engaging part formed near said hook-insertion hole of the clutch yoke for engaging with said hook by turning the bobbin housed in the clutch yoke in a predetermined direction.

10. An actuator as set forth in claim 5, wherein said case is composed of an outer case and an inner case to be fitted in the outer case;

said reduction gears are composed of a pinion secured to the motor shaft of said electric motor, a first gear rotatably supported by a first axle maintained in said inner case in parallel to said motor shaft and meshed with said pinion, a second gear rotatably supported by a second axle maintained in said inner case in parallel to said first axle and meshed with said first gear, a third gear rotatably supported by a third axle maintained in said inner gear in parallel to said second axle and meshed with said second gear, and a wheel gear combined with said rotor and meshed with said third gear.

* * * * *